United States Patent
Tamura et al.

(10) Patent No.: US 6,563,291 B2
(45) Date of Patent: May 13, 2003

(54) SET BATTERY CHARGING CONDITION DETECTING APPARATUS

(75) Inventors: Hiroshi Tamura, Nagoya (JP); Atsushi Imai, Anjo (JP); Haruyoshi Yamashita, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/187,690

(22) Filed: Jul. 1, 2002

(65) Prior Publication Data

US 2003/0015995 A1 Jan. 23, 2003

(30) Foreign Application Priority Data

Jul. 12, 2001 (JP) ........................................ 2001-212486

(51) Int. Cl.$^7$ ................................................ H02J 7/00
(52) U.S. Cl. ...................................... 320/116; 320/119
(58) Field of Search ............................... 320/116, 119, 320/112, 118, 120, 121, 136; 324/426

(56) References Cited

U.S. PATENT DOCUMENTS 6,020,718 A * 2/2000 Ozawa et al. ................ 320/116
6,249,125 B1 * 6/2001 Haddad et al. .............. 320/116

FOREIGN PATENT DOCUMENTS

| JP | U2-136445 | 11/1990 |
|---|---|---|
| JP | A-2000-134805 | 5/2000 |
| JP | A-2000-270485 | 9/2000 |
| JP | A-2001-25173 | 1/2001 |

* cited by examiner

Primary Examiner—Lawrence Luk
(74) Attorney, Agent, or Firm—Harness, Dickey & Pierce, PLC (57) ABSTRACT

An over-charge determining circuit provided for every unit cell generates, a cell over-charge detection signal which becomes high level when a cell voltage is higher than an upper limit value of an allowable voltage range thereof which is set as the threshold value voltage. The threshold value voltage is changed to a lower limit value of the allowable voltage range with which the cell over-charge detection signal surely becomes high level. Even when an output of an AND circuit for obtaining a logical product of the cell over-charge detection signals should become high, if an over-charge determining circuit of which output is fixed to the low level due to a fault of the like exists, the output of the AND circuit becomes low.

8 Claims, 7 Drawing Sheets

| CONDITION | SWITCH OFF (HIGH THRESHOLD) | | SWITCH ON (LOW THRESHOLD) | |
|---|---|---|---|---|
| | OOi (OR OUTPUT) | OAi (AND OUTPUT) | OOi (OR OUTPUT) | OAi (AND OUTPUT) |
| NORMAL | L | L | H | H |
| OVER-CHARGE OR DETERMINING CIRCUIT FAULT (FIXED TO H) | H | L | H | H |
| OVER-DISCHARGE OR DETERMINING CIRCUIT FAULT (FIXED TO L) | L | L | H | L |
| OVER-CHARGE OR OVER-DISCHARGE, OR DETERMINING CIRCUIT FAULT (H AND L) | H | L | H | L |
| OR CIRCUIT FAULT | FIXED TO H OR L | L | FIXED TO H OR L | H |
| AND CIRCUIT FAULT | L | FIXED TO H OR L | H | FIXED TO H OR L |
| SWITCH CIRCUIT FAULT OR REFERENCE VOLTAGE SOURCE FAULT | FIXED TO H OR L | | FIXED TO H OR L | |

SET BATTERY CHARGING CONDITION DETECTING APPARATUS

CROSS REFERENCE TO RELATED APPLICATION

This application is based on and incorporates herein by reference Japanese Patent Application No. 2001-212486 filed on Jul. 12, 2001.

FIELD OF THE INVENTION

The present invention relates to a charging condition detecting apparatus for detecting the charging condition of a large number of unit cells which are connected in series to form a set battery.

BACKGROUND OF THE INVENTION

Various electric vehicles (EV) and hybrid electric vehicles (HEV) are proposed, because these vehicles generate no or less exhaust gas. As a secondary battery used as the power source of these HEV and EV, a lead-acid battery, nickel-cadmium battery, nickel-hydrogen battery or the like are known. Moreover, in recent years, attention is paid to a lithium battery because this battery has a higher weight energy density, about four times the lead-acid battery of the same capacity and about two times the nickel-hydrogen battery. These battery can therefore be expected to provide reduction in size and weight.

The Japanese Unexamined Utility Model Publication H2-136445 discloses a method in which a cell voltage of each unit cell is detected by using voltage detectors which are connected in parallel to each unit cell. In this method, the charging/discharging current is controlled so that the cell voltage of any unit cell does not exceed, at the time of charging operation, the preset upper limit voltage and does not become lower than the preset lower limit voltage at the time of discharging operation.

Figure 8A:
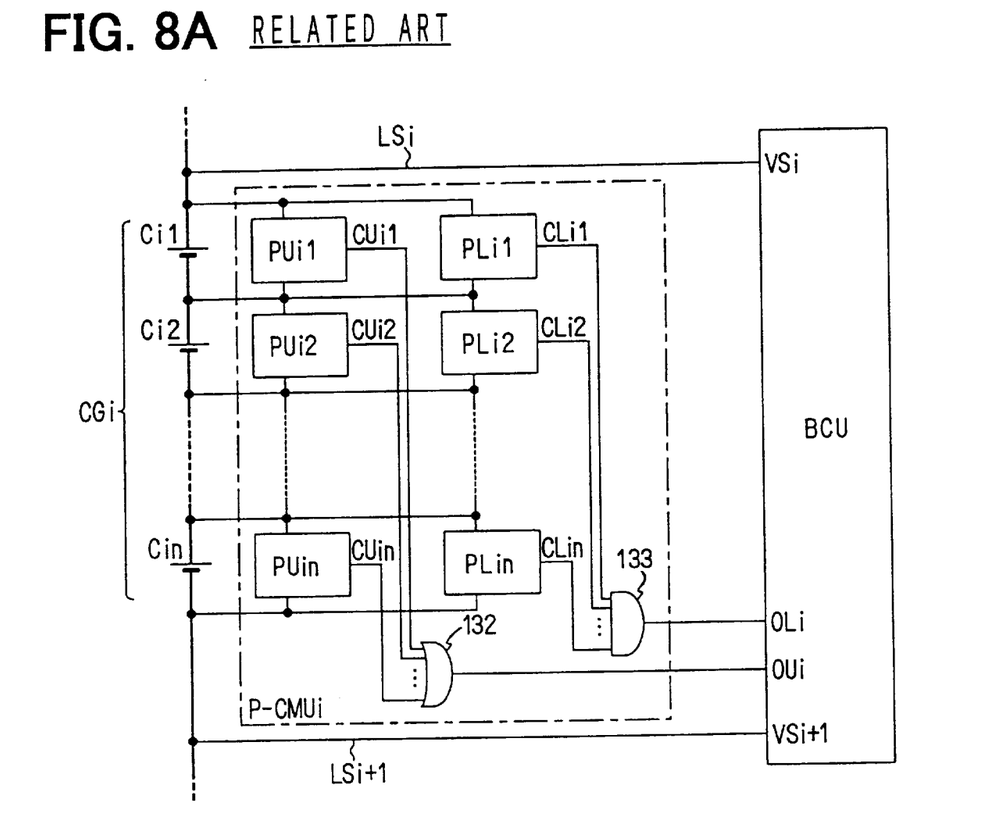
FIG. 8A is a block diagram showing a charging condition detecting apparatus in a related art.

Here, FIG. 8A is a circuit diagram showing an example of a charging condition detecting apparatus P-CMUi which divides a set battery into cell groups CGi (i=1 to m), each of which is constructed by n unit cells, and detects whether there is a unit cell in the over-charge or over-discharge condition among those Ci1 to Cin forming the cell group CGi.

The charging condition detecting apparatus P-CMUi has an over-charge determining circuit Puij which determines, for every unit cell Ci1 to Cin forming the cell group CGi, whether the unit cell Cij (j=1 to n) is in the over-charge condition or not and generates a cell over-charge detection signal CUij indicating the result of determination. It also has an over-discharge determining circuit PLij which determines whether the unit cell Cij is in the over-discharge condition or not and generates a cell over-charge detection signal CLij indicating the result of determination.

Figure 8B:
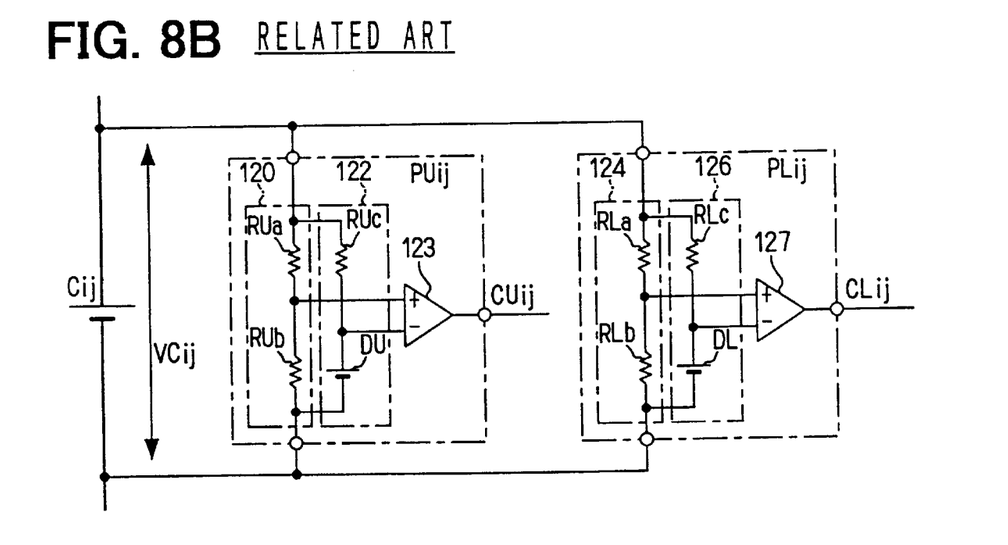
FIG. 8B is a circuit diagram showing an over-charge determining circuit and an over-discharge determining circuit shown in FIG. 8A.

As shown in FIG. 8B, each over-charge determining circuit PUij is constructed by a voltage dividing circuit 120 comprising resistors RUa and RUb to divide a cell voltage VCij across the unit cell Cij, a constant voltage circuit 122 comprising a resistor RUc and a voltage generation source DU to generate a constant upper limit reference voltage VRU and a comparator 123. To the comparator 123, a voltage depending on the cell voltage VCij is impressed to its non-inverting input via the voltage dividing circuit 120 and the upper limit reference voltage VRU generated by the constant voltage circuit 122 is impressed to its inverting input.

Moreover, each over-discharge determining circuit PLij is constructed by a voltage dividing circuit 124 comprising resistors RLa, RLb to divide the cell voltage VCij, a constant voltage circuit 126 comprising a resistor RLc and a voltage generation source DL to generate a constant lower limit reference voltage VRL and a comparator 127. To the comparator 127, a voltage depending on the cell voltage VCij is impressed to its non-inverting input via the voltage dividing circuit 124 and the lower limit reference voltage VRL generated by a constant voltage circuit 126 is impressed to its inverting input.

However, the voltage generation sources DU, DL generate the reference voltages VRU, VRL by utilizing, for example, a forward voltage of a diode and a breakdown voltage of a Zener diode. The upper limit reference voltage VRU generated by the voltage generation source DU of the over-charge determining circuit PUij is set to a value, VU·Rub/(RUa+RUb), obtained by dividing the upper limit value VU of the allowable voltage range of the cell voltage VCij in a voltage dividing ratio of the voltage dividing circuit 120. The lower limit reference voltage VRL generated by the voltage generation source DL of the over-discharge determining circuit PLij is set to a value, VL·RLb/(RLa+RLb), obtained by dividing the lower limit value VL of the allowable voltage range of the cell voltage VCij in a voltage dividing ratio of the voltage dividing circuit 124 comprised of resistors RLa, RLb.

The over-charge detection signal CUij generated by the over-charge determining circuit PUij becomes high level indicating that the unit cell Cij is in the cell over-charge condition when the cell voltage VCij is larger than the upper limit value VU of the allowable voltage range. It becomes low level when the cell voltage is smaller than the upper limit value VU. Moreover, the cell over-discharge detection signal CLij generated by the over-discharge determining circuit PLij becomes low level indicating that the unit cell Cij is in the over-discharge condition when the cell voltage VCij is smaller than the lower limit value VL of the allowable voltage range.

In addition, as shown in FIG. 8A, the charging condition detecting apparatus P-CMUi is provided with a logical sum (OR) circuit 132 which provides a high level output when any one of the cell over-charge detection signals CUi1 to CUin from each over-charge determining circuit PUi1 to PUin is in the high level. The detecting apparatus P-CMUi is further provided with a logical product (AND) circuit 133 which provides a low level output when any one of the cell over-discharge detection signals CLi1 to CLin from each over-discharge determining circuit PLi1 to PLin is in the low level. Thereby, an output of the OR circuit 132 is used as a groop over-charge detection signal OUi, while an output of the AND circuit 133 as a group over-discharge detection signal OLi.

That is, when all unit cells Ci1 to Cin forming a cell group CGi are in the normal charging condition (VL≦VCij≦VU), the group over-charge detection signal OUij becomes low level, while the group over-discharge detection signal OLij becomes high level. On the other hand, when any one of the unit cells Ci1 to Cin is in the over-charge condition (VCij>VU), the group over-charge detection signal OUi becomes high level. When any one of the unit cells is in the over-discharge condition (VCij<VL), the group over-discharge detection signal OLi becomes low level.

However, the charging condition detecting apparatus P-CMUi still has a problem that the unit cell Cij is continuously used under the over-charge or over-discharge condition. Thus the unit cell Cij, more specifically a set battery as a whole, can no longer be used because this apparatus cannot detect the over-charge condition or over-discharge condition of the unit cell Cij when the cell overcharge detection signal CUij, cell over-discharge detection signal CLij, group over-charge detection signal OUi or group over-discharge detection signal OLi is fixed to the signal level indicating the normal condition for some reason.

SUMMARY OF THE INVENTION

It is therefore an object of the present invention to detect faults or irregular conditions of a charging condition detecting apparatus for detecting, in the simplified structure, the charging condition of unit cells in every group.

According to the first aspect of the present invention, a charging condition detecting apparatus is respectively provided with a first voltage comparator and a second voltage comparator for each unit cell forming a chargeable/dischargeable set battery. In the first voltage comparator, when a cell voltage which is a voltage across the unit cell is higher than a first threshold value voltage which is set to the upper limit value of the allowable voltage range of the cell voltage, an output of this first comparator becomes an active level, while in the second voltage comparator, when the cell voltage of unit cell is lower than a second threshold value voltage which is set to the lower limit value of the allowable voltage range of the cell voltage, an output of this second comparator becomes an active level.

A first logical sum calculation circuit generates an overcharge detection signal by obtaining a logical sum of the outputs of the first voltage comparator provided for each unit cell. A second logical sum calculation circuit generates an over-discharge detection signal by obtaining a logical sum of the outputs of the second voltage comparator provided for each unit cell.

That is, if any one of the unit cells forming a set battery enters the over-charge condition (exceeding the upper limit value), the over-charge detection signal becomes the active level. If any one of the unit cells forming a set battery enters the over-discharge condition (lowering the lower limit value), the over-discharge detection signal becomes the active level.

Particularly, a threshold value voltage changing circuit changes, depending on an external command, a first threshold value voltage to a first inspection value which is lower than the lower limit value of the allowable voltage range. It also changes a second threshold value voltage to a second inspection value which is higher than the upper limit value of the allowable voltage range. Meanwhile, a first logical product calculation circuit generates a first fault detection signal by obtaining a logical product of
the outputs of the first voltage comparator provided for every unit cell, while a second logical product calculation circuit generates a second fault detection signal by obtaining a logical product of the outputs of the second voltage comparator provided for every unit cell.

According to the charging condition detecting apparatus of the present invention, not only it can be detected whether there are unit cells in the over-charge and over-discharge conditions or not among those forming a set battery based on the over-charge detection signal and over-discharge detection signal, but also a fault of a first voltage detecting circuit for generating the over-charge detection signal and the first logical sum calculation circuit and a second voltage detecting circuit for generating the over-discharge detection signal and the second logical sum calculation circuit can be detected by monitoring the first and second fault detection signals after the change of the first and second threshold value voltages with the threshold value voltage changing circuit.

That is, the outputs of the first and second voltage comparators after the change of the first and second threshold value voltages are in the active level and therefore outputs of a first and a second fault detection circuits have also to be in the active level. Accordingly, when an output of the first or the second fault detection circuit is not in the active level, it can be determined that a fault exists in any output of the first or second voltage comparator.

The active level may be set to any one of the high level and low level. When the active level is set as the high level, the first and second logical sum calculation circuit may be formed as a logical sum (OR) circuit and the first and second logical product calculation circuits may be formed as a logical product (AND) circuit. When the active level is set, on the contrary, as the low level, the first and second logical sum calculation circuits may be formed as a logical product (AND) circuit and the first and second logical product calculation circuits may be formed as a logical sum (OR) circuit.

According to the second aspect of the present invention, in a charging condition detecting apparatus, the voltage comparator provided for every unit cell forming a chargeable/dischargeable set battery provides an output in the active level when the cell voltage which is a voltage across the unit cell exceeds the threshold value voltage which is set to a boundary value of the allowable voltage range of the cell voltage in the outside of this voltage range and the logical sum calculation circuit generates a charging condition detection signal by obtaining a logical sum of the outputs of the voltage comparator provided for every unit cell.

That is, an output of the voltage comparator is in the active level, under the condition that the upper limit value of the allowable voltage range is set as the boundary value, when the cell voltage exceeds this upper limit value. When the lower limit value of the allowable voltage range is set as the boundary value, the output of the voltage comparator is in the active level when the cell voltage is lower than the lower limit value.

The threshold value voltage changing circuit changes, depending on an external command, a threshold value to an inspection value for setting an output of the voltage comparator to the active level from the boundary value when the cell voltage of unit cell is within the allowable voltage range and the logical product calculation circuit generates a fault detection signal by obtaining a logical product of the outputs of the voltage comparator provided for every unit cell.

More practically, when the upper limit value of the allowable voltage range is set as the boundary value, the inspection value is set to a value lower than the lower limit value of the allowable voltage range. When the lower limit value of the allowable voltage range is set as the boundary value, the inspection value may be set to a value larger than the upper limit value of the allowable voltage range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

[First Embodiment]

Figure 1:
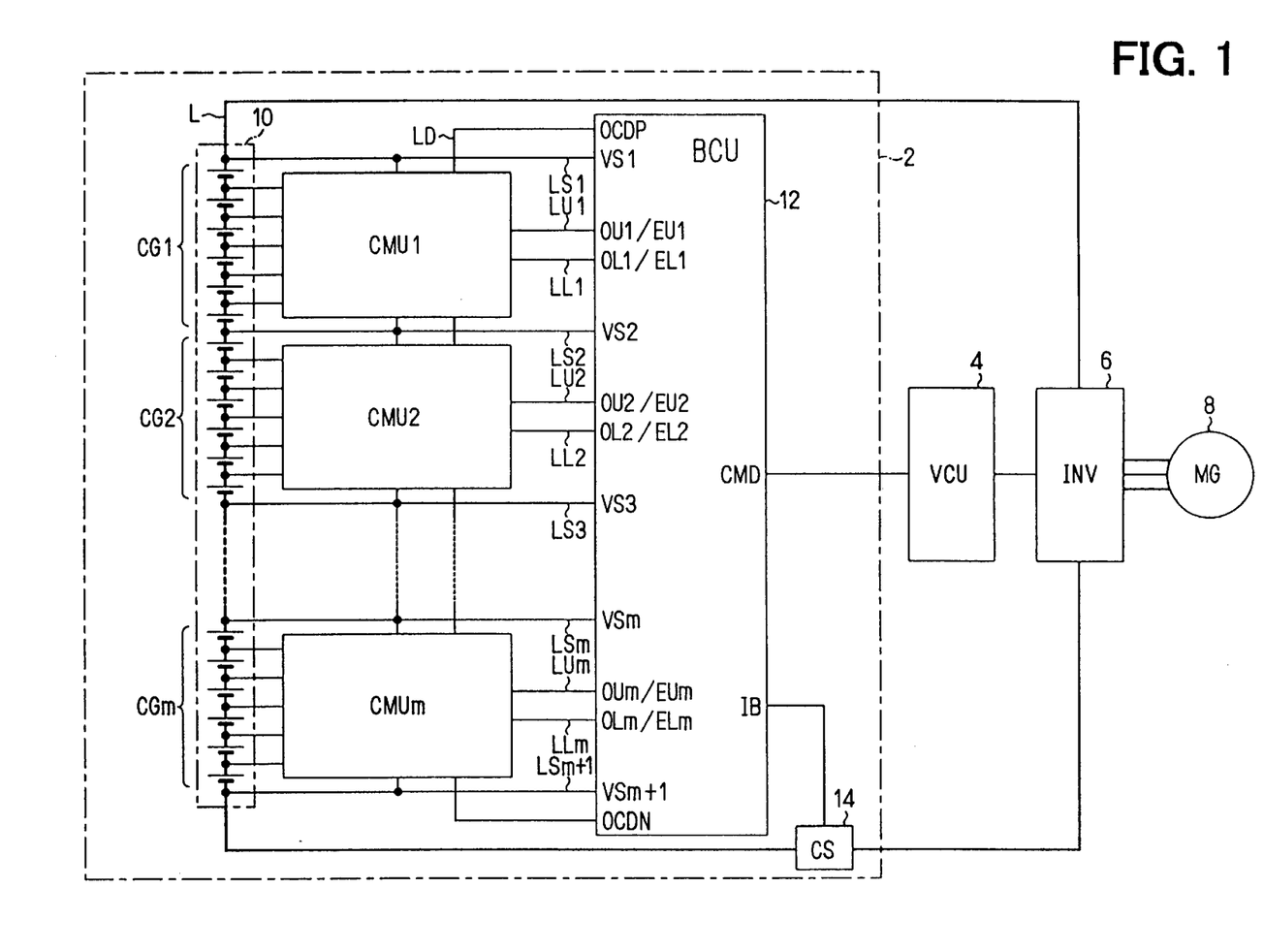
FIG. 1 is a block diagram showing a set battery system.

Referring first to FIG. 1, a set battery system 2 of a vehicle is connected to a motor generator (MG) 8, which operates as a motor and a generator (alternator), via a main power supply line L and an inverter (INV) 6. A vehicle control unit (VCU) 4 for a hybrid electric vehicle (HEV) is provided for controlling start and stop of the motor generator 8 and operation direction or the like of the inverter 6 depending on the running condition of the vehicle or the condition of the set battery system 2.

The VCU 4 sets the vehicle to run by a driving force of an engine while the vehicle is running at the constant speed in the high operating efficiency of the engine. If the amount of charge of the set battery system 2 is insufficient, the VCU 4 also sets the vehicle condition so that the driving force of engine is transferred to the motor generator 8. This motor generator 8 also operates as the alternator to supply the power generated therein to the set battery system 2 for charging the set battery system 2.

Meanwhile, when the engine is started or when the vehicle is in the full acceleration condition in the rather low operating efficiency of the engine, the VCU 4 sets the vehicle so that the electric power is fed to the motor generator 8 from the set battery system 2 via the inverter 6 and therefore operates as a motor by receiving the power supplied from the set battery system 2. The vehicle can continue to run utilizing the driving force from the motor generator 8.

Moreover, the set battery system 2 is comprised of a set battery 10 which is formed by connecting a number of unit cells in series, each of which is formed of a lithium battery as a chargeable/dischargeable secondary battery. The set battery 10 is divided into a plurality of cell groups CG1 to CGm, each of which includes a plurality of cells Ci1 to Cin (n=6 in this embodiment). This set battery 10 is also provided with a charging condition detecting apparatus CMUi for generating a group over-charge detection signal OUi and a group over-discharge detection signal OLi indicating the result of determination. The apparatus CMUi also generates a first fault detection signal EUi and a second fault detection signal ELi to determine the charging condition of each unit cell Ci1 to Cin forming the cell group CGi for each cell group CGi (i=1 to m) and an internal fault.

Here, the group over-discharge detection signal OUi and the first fault detection signal EUi are transmitted via a signal line LUi. The group over-discharge detection signal OLi and the second fault detection signal ELi are transmitted via a signal line LLi. Moreover, in the signal lines LUi and LLi, the transmission signal is switched depending on the supply or non-supply of power source via the power source supply line LD.

Moreover, the set battery system 2 is provided with a current sensor (CS) 14 for detecting a main circuit current flowing into the main power source line L when the set battery 10 is charged and discharged. The system 2 is further provided with a set battery control unit (BCU) 12 which outputs various commands CMD to the VCU 4 based on a detection signal IB from the current sensor 14, voltage signals VS1 to VSm+1 obtained via the cell group voltage detection lines LS1 to LSm+1 branched from the main power source supply line L across the set battery 10 and at the boundary of the cell group CGi, group over-charge detection signals OU1 to OUm from each charging condition detecting apparatus CMU1 to CMUm and group over-discharge detection signals OL1 to OLm. The BCU 12 thus executes the process such as the monitoring of a fault in the charging condition detecting apparatuses CMU1 to CMUm by conducting the power source supply line LD.

Figure 2:
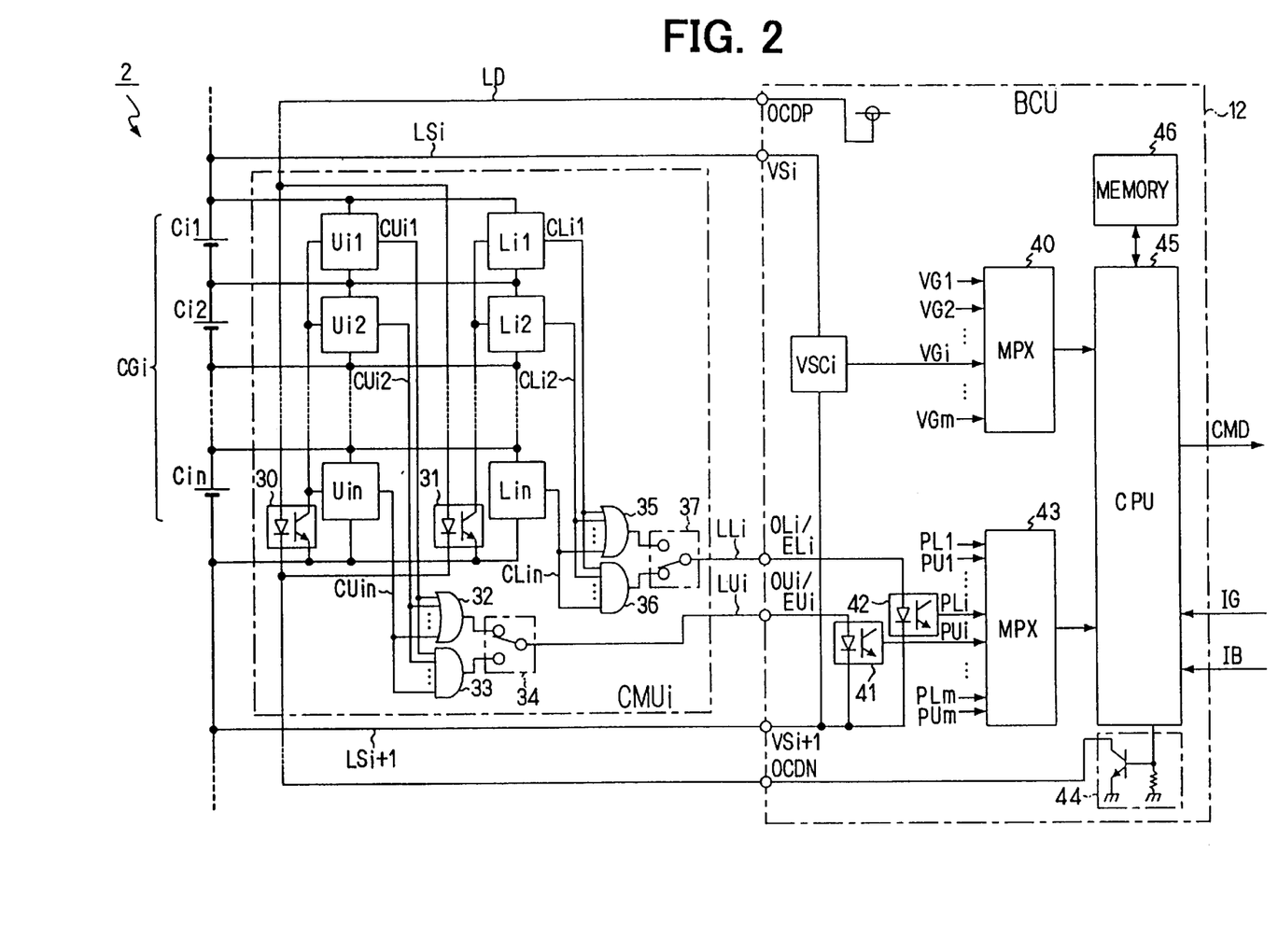
FIG. 2 is a block diagram showing a charging condition detecting apparatus and a set battery control unit in the first embodiment of the present invention.

The charging condition detecting apparatus CMUi and BCU 12 are shown in detail in FIG. 2.

The charging condition detecting apparatus CMUi is provided with an over-charge determining circuit Uij as a first voltage comparator which determines, for each unit cell Ci1 to Cin forming the cell group CGi, whether the cell voltage VCij (j=1 to n) is larger than the upper limit value VU (4.2V) of the allowable voltage range or not and generates a cell over-charge detection signal CUij which becomes high level when the cell voltage VCij is larger than the upper limit value VU. It is also provided with an over-discharge determining circuit Lij as a second voltage comparator which determines whether the cell voltage VCij is smaller than the lower limit value VL (3.0V) of the allowable voltage range or not and generates a cell over-discharge detection signal CLij which becomes low level when the cell voltage VCij is smaller than the lower limit value VL.

Figure 3:
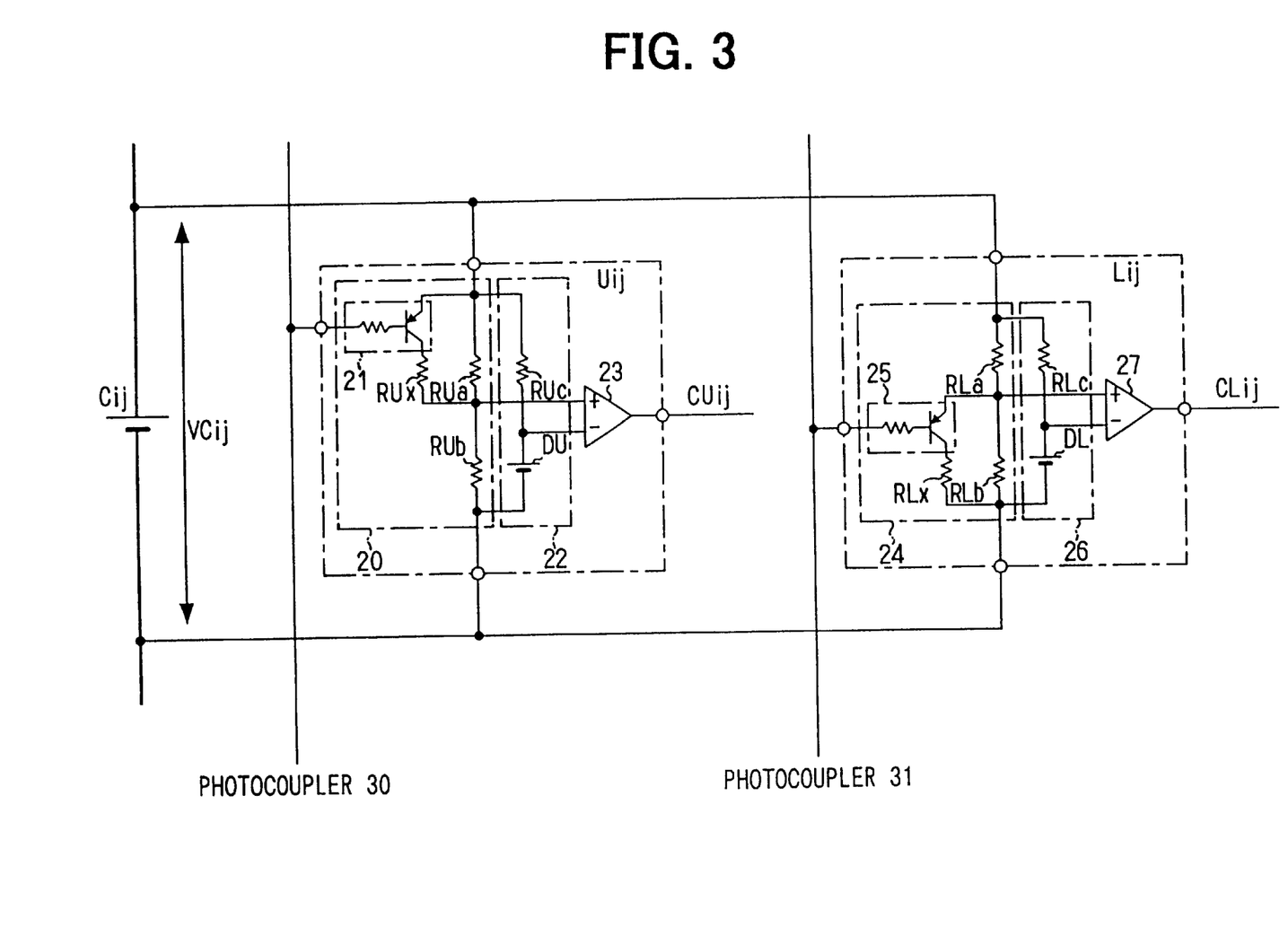
FIG. 3 is a circuit diagram showing an over-charge determining circuit and an over-discharge determining circuit used in the first embodiment.

The over-charge determining circuit Uij is composed, as shown in FIG. 3, of a voltage dividing circuit 20 for dividing the cell voltage VCij, a constant voltage circuit 22 comprised of a resistor RUc and a voltage generating source DU and a comparator 23 which impresses a voltage obtained by dividing the cell voltage VCij by the voltage dividing circuit 20 to the non-inverting input and also impresses a constant upper limit reference voltage VRU generated by the constant voltage circuit 22 to the inverting input.

The voltage dividing circuit 20 is constructed with resistors RUa, Rub which are connected in series, and the connecting point thereof is connected to the non-inverting input of the comparator 23, a resistor RUx connected in parallel to the resistor RUa and a switch circuit 21 comprised of a resistor and a transistor to make conductive a current path of the resistor RUx when the power source is supplied via the power source supply line LD. That is, a voltage dividing ratio of the voltage dividing circuit 20 is set, when the switch circuit 21 is OFF, to a first voltage dividing ratio BU1 which is determined by the resistors RUa and RUb connected in series. It is also set, when the switch circuit 21 is ON, to a second voltage dividing ratio BU2 which is determined by the resistors RUa, RUx connected in parallel and a resistor RUb connected in series to above resistors.

$$BU1 = \frac{Rub}{RUa + RUb} \text{ and } BU2 = \frac{Rub}{(RUa // RUx) + RUb}, \quad \text{[Equation 1]}$$

$$\text{Where } A // B = \frac{A \cdot B}{A + B}$$

Meanwhile, the over-discharge determining circuit Lij is constructed with, like the over-charge determining circuit Uij, a voltage dividing circuit 24 for dividing the cell voltage VCij, a constant voltage circuit 26 comprised of a resistor RLc and a voltage generation source DL and a comparator 27 impressing a voltage obtained by dividing the cell voltage VCij with the voltage dividing circuit 24 to the non-inverting input and also impressing the constant lower limit reference voltage VRL generated by the constant voltage circuit 26 to the inverting input.

The voltage dividing circuit 24 is constructed with resistors RLa, RLb which are connected in series with the connecting point thereof connected to the non-inverting input of the comparator 27, a resistor RLx connected in parallel to the resistor RLb and a switch circuit 25 which is constructed with a resistor and a transistor to make conductive a current path of the resistor RLx when the power source is supplied via the power source supply line LD. The voltage dividing ratio of the voltage dividing circuit 24 is set, when the switch circuit 25 is OFF, to a first voltage dividing ratio BL1 which is determined by the resistors RLa, RLb connected in series. It is also set, when the switch circuit 25 is ON, to a second voltage dividing ratio BL2 which is determined by the resistors RLb, RLx connected in parallel and the resistor RLa connected in series to above resistors.

$$BL1 = \frac{RLb}{RLa + RLb} \text{ and } BL2 = \frac{RLb // RLx}{RLa + (RLb // RLx)} \quad \text{[Equation 2]}$$

However, in the voltage generation sources DU, DL, the reference voltages VRU, VRL are generated using the forward voltage of a diode and the breakdown voltage of a Zener diode. The upper limit reference voltage VRU generated by the voltage generation source DU of the over-charge determining circuit Uij is set to a value (=VU·BU1) obtained by dividing the upper limit value VU of the allowable voltage range of the unit cell Cij by the resistors RUa, RUb. Meanwhile, the lower limit reference voltage VRL generated by the voltage generation source DL of the over-discharge determining circuit Lij is set to a value (=VL·BL1) obtained by dividing the lower limit value VL of the allowable voltage range of unit cell Cij with the resistors RLa, RLb.

In this embodiment, VU=4.2V, VL=3.0V, the resistors RUa, RUb, RUx are set to result in BU1=0.5, BU2=0.7, while the resistors RLa, RLb, RLx are set to result in BL1=0.7, BL2=0.5.

The comparator 23 of the over-charge determining circuit Uij is impressed, when a voltage dividing ratio of the voltage dividing circuit 20 is set to the first voltage dividing ratio BU1 (when the switch circuit 21 is OFF), by the voltage VCij·BU1 at the non-inverting input and by the voltage VU·BU1 at the inverting input. Therefore, the cell over-charge detection signal CUij as an output of the comparator 23 becomes high level when the cell voltage VCij is larger than the upper limit value VU (=4.2V) of the allowable voltage range which is set as the threshold value voltage. It becomes low level when the cell voltage VCij is smaller than such threshold value voltage.

Moreover, the comparator 23 is impressed, when the voltage dividing ratio of the voltage dividing circuit 20 is set to the second voltage dividing ratio BU2 (when the switch circuit 21 is ON), by the voltage VCij·BU2 at the non-inverting input and by the voltage VU·BU1 at the inverting input. Therefore, the cell over-charge detection signal CUij becomes high level when the cell voltage VCij is larger than the voltage Vu·BU1/BU2 (=3.0V) which is set as the threshold value voltage. It becomes low level when the cell voltage VCij is smaller than the threshold value voltage.

In the same manner, the comparator 27 of the over-discharge determining circuit Lij is impressed, when the voltage dividing ratio of the voltage dividing circuit 24 is set to the first voltage dividing ratio BL1 (when the switch circuit 25 is OFF), by the voltage VCij·BL1 at the non-inverting input and by the voltage VL·BL1 at the inverting input. Therefore, the cell over-discharge detection signal CLij as an output of the comparator 27 becomes low level when the cell voltage VCij is smaller than the lower limit value VL (=3.0V) of the allowable voltage range which is set as the threshold value voltage. It becomes high level when the cell voltage VCij is larger than the threshold value voltage.

Moreover, the comparator 27 is impressed, when the voltage dividing ratio of the voltage dividing circuit 24 is set to the second voltage dividing ratio BL2 (when the switch circuit 25 is ON), by the voltage VCij·BL2 at the non-inverting input and by the voltage VL·BL1 at the inverting input. Therefore, the cell over-discharge detection signal CLij becomes low level when the cell voltage VCij is smaller than the voltage VL·BL1/BL2 (=4.2V) which is set as the threshold value voltage. It becomes high level when the cell voltage VCij is larger than the threshold value voltage.

The charging condition detecting apparatus CMUi is provided, as shown in FIG. 2, with a photocoupler 30 which turns on by itself upon reception of the power source voltage through the power source supply line LD and simultaneously turns on the switch circuit 21 forming the over-charge determining circuits Ui1 to Uin and changes the voltage dividing ratio of the voltage dividing circuit 20 to the second voltage dividing ratio BU2 from the first voltage dividing ratio BU1. It is further provided with a photocoupler 31 which turns on by itself upon reception of the power source voltage through the power source supply line LD and simultaneously turns on the switch circuit 25 forming the over-discharge determining circuits Li1 to Lin and changes the voltage dividing ratio of the voltage dividing circuit 24 to the second voltage dividing ratio BL2 from the first voltage dividing ratio BL1.

Moreover, the charging condition detecting apparatus CMUi is also provided with a logical sum (OR) circuit 32 as a first logical sum calculation circuit which provides a high level output when any one of the cell over-charge detection signals CUi1 to CUin is high level and generates a group over-charge detection signal OUi, a logical product (AND) circuit 33 as a first logical product calculation circuit which provides an high level output when all of the cell over-charge detection signals CUi1 to CUin are high level and also generates a first fault detection signal EUi and a selection circuit 34 which selects the group over-charge detection signal OUi when the photocoupler 30 is OFF or the first fault detection signal EUi when the photocoupler 30 is ON and then outputs the selected signal to the BCU 12.

Moreover, the charging condition detecting apparatus CMUi is provided with an AND circuit 36 as a second logical sum calculation circuit which generates a group over-discharge detection signal OLi which becomes low level when any one of the cell over-discharge detection signals CLi1 to CLin is low level, an OR circuit 35 as a second logical product calculation circuit which generates a second fault detection signal ELi which becomes low level when all of the cell over-discharge detection signals CLi1 to CLin are low level, and a selection circuit 37 which selects the group over-discharge detection signal OLi when the photocoupler 31 is OFF or the second fault detection signal ELi when the photocoupler 31 is ON and then outputs the selected signal to the BCU 12.

The charging condition detecting apparatus CMUi supplies, when the power source supply line LD is not conductive, the group over-charge detection signal OUi of high level to the BCU 12 via the signal line LUi when any one of the unit cells Ci1 to Cin forming the cell group CGi is in the over-charge condition, namely when the unit cells having the cell voltage VCij higher than the upper limit value VU of the allowable voltage range exist and also supplies the group over-discharge detection signal OLi of low level to the BCU 12 via the signal line LLi when any one of the unit cells Ci1 to Cin forming the cell group CGi is in the over-discharge condition, namely the unit cells having the cell voltage VCij smaller than lower limit value VL of the allowable voltage range exist.

Meanwhile, when the power source supply line LD is conductive, this charging condition detecting apparatus CMUi supplies the first fault detection signal EUi of high level to the BCU 12 via the signal line LUi when the cell voltage VCij of all unit cells Ci1 to Cin forming the cell group CGi is larger than the upper limit value VU or within the allowable voltage range and also supplies the second fault detection signal ELi of low level to the BCU 12 via the signal line LLi when the cell voltage VCij of all unit cells Ci1 to Cin forming the cell group CGi is smaller than the lower limit value VL or within the allowable voltage range.

The BCU 12 is provided with a multiplexer (MPX) 40 for fetching a group voltage VGi detected with the selected group voltage detecting circuit VSCi by selecting any one of the group voltage detecting circuit VSC1 to VSCm provided for each cell group CG1 to CGm, an MPX 43 for fetching respectively, via photocouplers 41, 42, the signals OUi/EUi, OLi/ELi supplied via the signal lines LUi, LLi of the selected charging condition detecting apparatus CMUi by selecting any one of the charging condition detecting apparatuses CMU1 to CMUm, a switch circuit 44 which is formed of a transistor and a resistor to make conductive or non-conductive the power source supply line LD to the photocouplers 30, 31 of the charging condition detecting apparatuses CMU1 to CMUm connected in series between the terminals OCDP and OCDN, an arithmetic operation processor (CPU) 45 for executing the processes to generate various commands CMD to be outputted to the VCU 4 in order to control the main circuit current based on the group voltages VG1 to VGm obtained via the MPX 40, a signal IG indicating the manipulation condition of an ignition switch and a detection signal IB from the current sensor 14 and a memory 46 for storing the data or the like required for the processes explained above.

Here, the processes executed by the CPU 45 will be outlined below.

First, upon detection that the ignition switch is turned on by the ignition signal IG, the CPU 45 sets the switch circuit 44 to OFF state to set each charging condition detecting apparatus CMUi to supply the group over-charge detection signal OUi and group over-discharge detection signal OLi via the signal lines LUi, LLi and repeatedly detects both signals OUi, OLi for each cell group CG1 to CGm.

In this case, when the cell voltages of unit cells Ci1 to Cin forming the cell group CGi are in the available voltage range, the group over-charge detection signal Oui becomes low level and the group over-discharge detection signal OLi become high level.

When the group over-charge detection signal Oui changes to the high level from the low level, the CPU 45 issues a command CMD for instructing the VCU 4 to control with priority the main circuit current for the discharge operation under the assumption that any one of the unit cells Ci1 to Cin forming the cell group CGi is in the over-charge condition.

Thereafter, when the group over-charge detection signal OUi changes to the low level from the high level, the CPU 45 issues a command CMD to return the VCU 4 to the ordinary control condition under the assumption that the over-charge condition of the unit cell has been cancelled.

On the other hand, if the group over-charge detection signal OUi does not change to the low level even after the predetermined constant period has passed from the start of the control with priority for discharge, or if the group overcharge detection signal OUi does not change to the low level even after the group voltage VGi of the cell group CGi of which group over-charge detection signal OUi becomes high level has been reduced by the preset constant voltage or larger, the CPU 45 outputs a command CMD to inhibit charge and discharge operations of the set battery 10 to the VCU 4 under the assumption that a non-restorable fault arose and notifies this event to a display unit or acoustic device (not shown).

Similarly, when the group over-discharge detection signal OLi changes to the low level from the high level, the CPU 45 also outputs a command CMD to make the VCU 4 control a current of the main circuit current with priority for the charge operation.

Thereafter, when the group over-discharge detection signal OLi changes to the high level from the low level, the CPU 45 outputs a command CMD to the VCU 4 to return the control to the ordinary one under the assumption that the over-discharge condition of unit cell is cancelled.

Meanwhile, when the group over-discharge detection signal OLi does not change to the high level even after the preset constant period has passed from the start of the control with priority for the charge operation or when the group over-discharge detection signal OLi does not change to the high level even after the group voltage VGi of the cell group CGi in which the group over-discharge detection signal OLi becomes low level has increased by the preset constant voltage or more, the CPU 45 outputs a command CMD to inhibit charge and discharge operations of the set battery 10 to the VCU 4. The CPU 45 then notifies this event to a user via a display unit or acoustic device under the assumption that a non-restorable fault is generated.

Moreover, the CPU 45 executes, other than the controls explained above, a fault diagnosis in every preset period. However, this fault diagnostic operation is executed only when the all group over-charge detection signals OU1 to OUm are low level and all group over-discharge detection signals OL1 to OLm are high level, namely when the cell voltages of all unit cells C11 to Cmn are in the available voltage range.

In this fault diagnosis, it is set that the first fault detection signal EUi and the second fault detection signal ELi are supplied via the signal lines LUi, LLi from each charging operation detecting apparatus CMUi by setting the switch circuit 44 to the ON state and both signals EUi, ELi are detected in every cell group CG1 to CGm.

In this case, since the cell voltages of all unit cells Ci1 to Cin forming the cell group CGi are within the available voltage range, the first fault detection signal EUi must be in the high level, while the second fault detection signal ELi must be in the low level.

However, when the first fault detection signal EUi is low level, the CPU 45 outputs a command CMD to inhibit the charge and discharge operations of the set battery 10 to the VCU 4 and notifies this event to a user via a display unit and acoustic device under the assumption that a fault arose in any one of the over-charge determining circuits Ui1 to Uin and OR circuit 32 to generate the group over-charge detection signal OUi or the AND circuit 33 to generate the first fault detection signal EUi itself.

Similarly, when the second fault detection signal ELi is high level, the CPU 45 outputs a command CMD to inhibit the charge and discharge operations of the set battery 10 to the VCU 4 and notifies this event to a user via a display unit or acoustic device under the assumption that a fault arose in any one of the over-discharge determining circuits Li1 to Lin and AND circuit 36 to generate the group over-discharge detection signal OLi or the OR circuit 35 to generate the second fault detection signal ELi itself.

As explained above, since the charging condition detecting apparatus CMU1 to CMUm is provided for every cell group CG1 to CGm in the set battery system 2, the existence of unit cell in the over-charge or over-discharge condition can be detected for every unit cell Ci1 to Cin forming the cell group CGi based on the group over-charge detection signal OUi and the group over-discharge detection signal OLi outputted from the charging condition detecting apparatus CMUi. Further a fault within the charging condition detecting apparatus CMUi can be detected based on the first and second fault detection signals EUi, ELi outputted from the charging condition detecting apparatus CMUi.

Therefore, according to the set battery system 2, the maximum performance of the set battery 10 can be attained by improving reliability of the group over-charge detection signal OUi and group over-discharge detection signal OLi and surely preventing that the unit cell Cij is continuously used under the over-charge or over-discharge condition.

For example, when an output (cell over-charge detection signal CUij) of the over-charge determining circuit Uij is fixed to the low level caused by a certain fault, since the group over-charge detection signal OUi detected under the ordinary control is maintained in the low level even if the unit cell Cij is in the over-charge condition, such overcharge condition cannot be detected but generation of a fault can be detected because the first fault detection signal EUi detected when the diagnosis is carried out becomes low level. Similarly, when an output (cell over-discharge detection signal CLij) of the over-discharge determining circuit Lij is fixed to the high level caused by a certain fault, since the group over-discharge detection signal OLi detected under the ordinary control is maintained in the high level even if the unit cell Cij is in the over-discharge condition, such over-discharge condition cannot be detected but generation of a fault can be detected because the second fault detection signal ELi detected when the diagnosis is carried out becomes high level.

Moreover, for example, when an output (group over-charge detection signal Oui) of the OR circuit 32 and an output (group over-charge detection signal OLi) of the AND circuit 36 are fixed with a certain fault, such fault can also be detected.

In addition, according to this embodiment, only addition of the switch circuits 21, 25 to each over-charge determining circuit Uij and each over-discharge determining circuit Lij and addition of the photocouplers 30, 31, AND circuit 33 and OR circuit 35 to every charging condition detecting apparatus CMUi enables generation of the first and second fault detection signals EUi, ELi, in comparison with the conventional apparatus. Moreover, since the signal to be outputted via the signal lines LUi, LLi is switched by the group over-charge detection signal OUi, group over-discharge detection signal OLi and first and second fault detection signals EUi, ELi by providing the selection circuits 34, 37, the first and second fault detection signals EUi, ELi can be supplied to the BCU 12 without increase of wiring between the charging condition detecting apparatus CMU1 to CMUm and the BCU 12.

Moreover, according to this embodiment, since each charging condition detecting apparatus CMUi is operated by receiving the power source voltage from the cell group CGi as the detection object, the apparatus of the same structure can be used for any cell groups CG1 to CGm and the apparatus structure can therefore be simplified.

Here, the first fault detection signal EUi is transmitted to the BCU 12 using the signal line LUi used for transmission of the group over-charge detection signal Oui and the second fault detection signal ELi using the signal line LLi used for transmission of the group over-discharge detection signal OLi, but it is also possible that the selection circuits 34, 37 are omitted and the first fault detection signal EUi and the second fault detection signal ELi are individually supplied to the BCU 12 using the signal line different from the signal lines LUi, LLi.

Moreover, setting has been conducted so that the threshold value (inspection value) of the over-charge determining circuit Uij during the fault diagnostic process becomes equal to the lower limit value VL of the available voltage range of the cell voltage and the threshold value (inspection value) of the over-discharge determining circuit Lij becomes equal to the upper limit value VU of the available voltage range of the cell voltage, but any setting may be conducted to any value when the inspection value is lower than the lower limit value VL in the over-charge determining circuit Uij and is higher than the upper limit value VU in the over-discharge detection circuit Lij.

[Second Embodiment]

Figure 4:
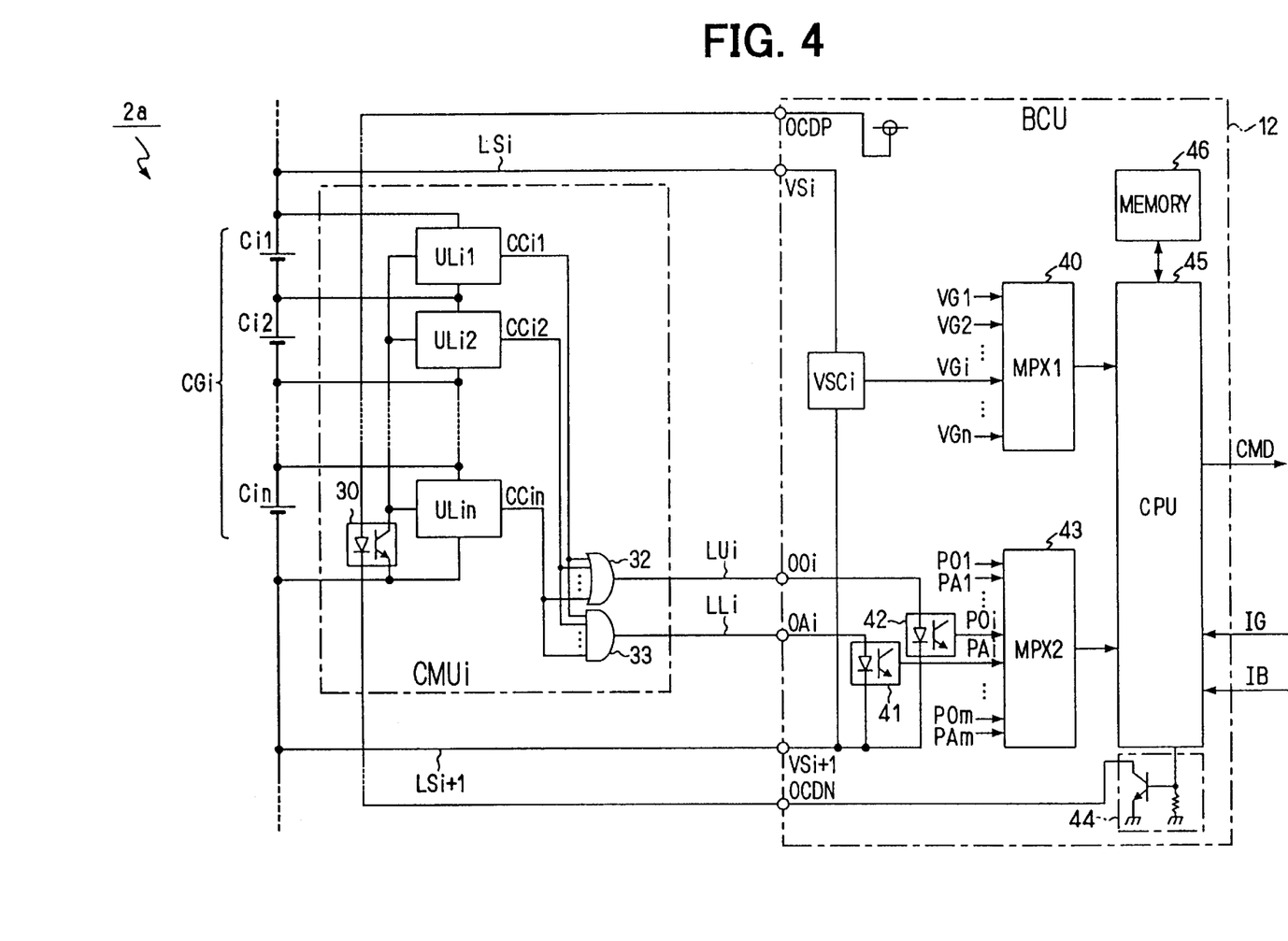
FIG. 4 is a block diagram showing a charging condition detecting apparatus and a set battery control unit in the second embodiment of the present invention.

In the second embodiment, the charging condition detecting apparatuses CMU1 to CMUm are partly different in a set battery system 2a from those in the first embodiment. FIG. 4 shows the charging condition detecting apparatus CMUi in the set battery system 2a of this embodiment.

As shown in FIG. 4, the charging condition detecting apparatus CMUi is constructed in the manner that the over-discharge determining circuits Li1 to Lin, photocoupler 31, OR circuit 35, AND circuit 36, selection circuits 34, 37 are eliminated from the structure of the first embodiment, overcharge/discharge determining circuits ULi1 to ULin are provided as the voltage comparator in place of the over-charge determining circuits Ui1 to Uin. The output of the OR circuit 32 as the logical sum calculation circuit is supplied to the BCU 12 via the signal line LUi, while the output of the AND circuit 33 as the logical product calculation circuit is supplied to the BCU 12 via the signal line LLi.

The over-charge/discharge determining circuits ULi1 to ULin are constructed exactly same as the over-charge determining circuits Ui1 to Uin of the first embodiment (FIG. 3). The over-charge/discharge determining circuits ULi1 to ULin outputs, when the photocoupler 30 is OFF, a determining signal which becomes high level when the cell voltage VCij is larger than the upper limit value VU of the available voltage range of the cell voltage which is set as the threshold value and becomes low when the cell voltage VCij is smaller than the threshold value. Moreover, when the photocoupler 30 is ON, these over-charge/discharge determining circuits ULi1 to ULin outputs a determining signal which becomes low level when the cell voltage VCij is smaller than the lower limit value VL of the available voltage range of the cell voltage which is set as the threshold value and becomes high level when the cell voltage VCij is larger than the threshold value.

In the charging condition detecting apparatus CMUi constructed as explained above, when the photocoupler 30 is OFF, an output of the OR circuit 32 becomes exactly same as the group over-charge detection signal OUi and the second fault detection signal ELi in the first embodiment. Moreover, when the photocoupler 30 is ON, an output of the AND circuit 33 becomes exactly same as the group over-discharge detection signal OLi and the first fault detection signal EUi in the first embodiment.

Moreover, in the set battery system 2a of this embodiment, the CPU 45 executes simultaneously the ordinary control for detecting the over-charge and over-discharge conditions of unit cell for every cell group CGi and the fault diagnostic operation for detecting a fault in the charging condition detecting apparatus CMUi. Such controls will be outlined below.

First, when it is detected by the ignition signal IG that the ignition switch is turned on, the CPU 45 subsequently alternately switches the ON/OFF states of the switch circuit 44 in every constant period and also stores the level of the signal obtained via the signal lines LUi, LLi for each state.

When the switch circuit 44 is OFF, namely when the photocoupler 30 is OFF, and the signal supplied via the signal line LLi is high level, the CPU 45 determines that the charging condition detecting apparatus CMUi is faulty. The signal is referred to as a high threshold value AND output. Also, when the switch circuit 44 is On, namely when the photocoupler 30 is ON, and the signal supplied via the signal line LUi is low level, the CPU 45 determines that the charging condition detecting apparatus CMUi is faulty. The signal is referred to as a low threshold value OR output. In such cases, the CPU 45 immediately outputs a command CMD for inhibiting the charge/discharge operation of the set battery 10 to the VCU 4. The CPU 45 also notifies a user of this event via a display unit or acoustic device (not shown).

On the other hand, when the high threshold value AND output is at low level and a low threshold value OR output is at high level, the following controls are executed depending on the signal supplied through the signal line LUi when the switch circuit 44 is OFF (high threshold value OR output) and the signal supplied through the signal line LLi when the switch circuit 44 is ON (low threshold value AND output).

Namely, when the high threshold value OR output is high level and low threshold value AND output is high level, operations are similar to that when the group over-charge detection signal OUi changes to the high level from the low level in the first embodiment under the assumption that there exits the unit cells in the over-charge condition in the cell group CGi.

Moreover, when the high threshold value OR output is at low level and the low threshold value AND output is at low level, operations are similar to that when the group over-discharge detection signal OLi changes to the low level from the high level in the first embodiment under the assumption that there exists the unit cells in the over-discharge condition in the cell group CGi.

In addition, when the high threshold value OR output is at high level and the low threshold value AND output is at low level, the CPU 45 immediately outputs a command CMD to inhibit the charge/discharge operation of the set battery 10 to the VCU 4 and also notifies this event to a user via a display unit or acoustic device under the assumption that there simultaneously exists the unit cells in the over-charge condition and over-discharge condition in the cell group CGi or the other fault arose therein.

Figure 5:
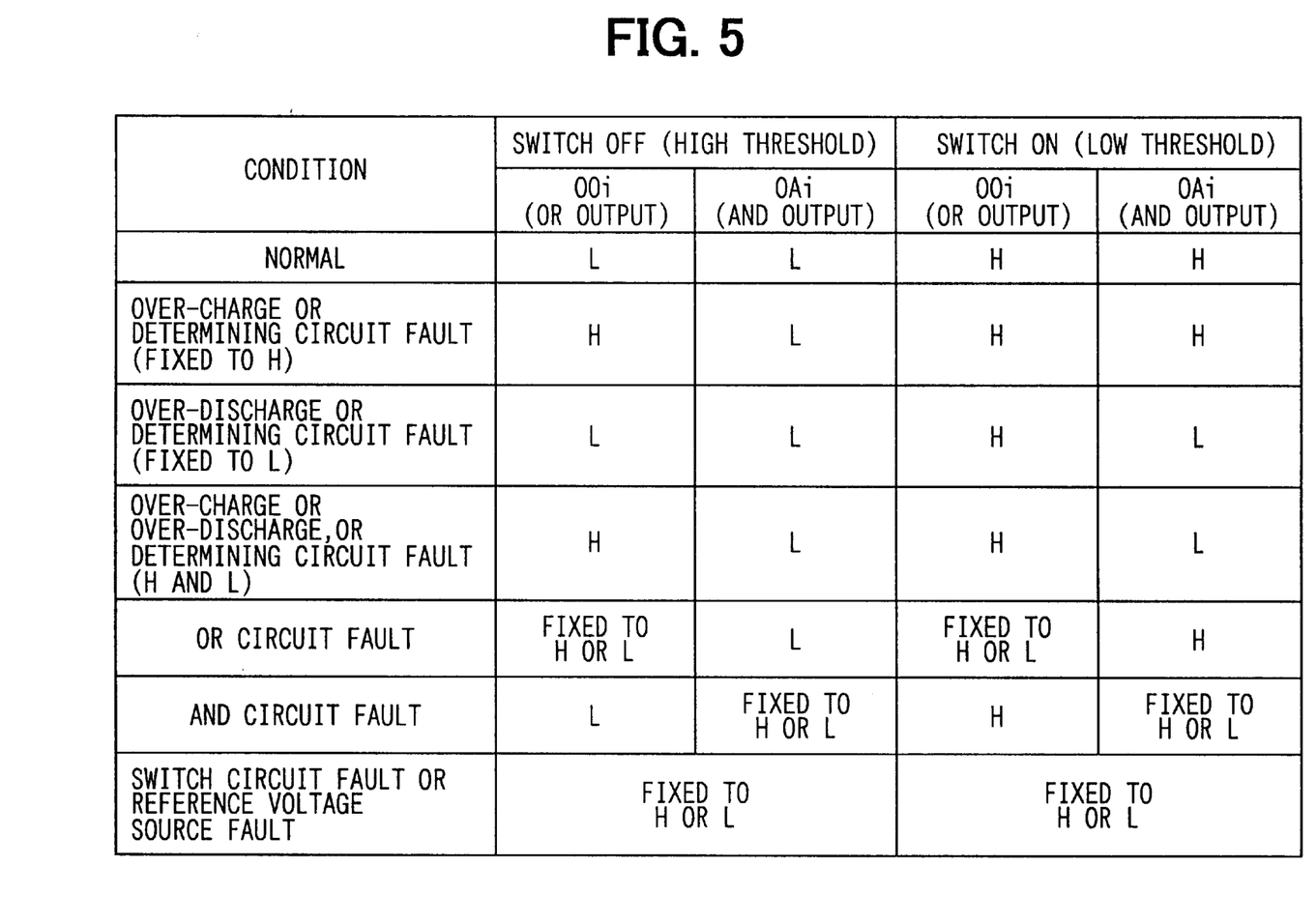
FIG. 5 is a table showing the relationship between signal levels of output signals of the charging condition detecting apparatus and the internal conditions of apparatus estimated from the signal levels in the second embodiment.

FIG. 5 is a table showing correspondence between the levels of the signals supplied through the signal lines LLi, LUi and the conditions estimated from such signal levels.

According to the set battery system 2a of this embodiment, since the signals similar to the group over-charge detection signal OUi (high threshold value OR output), group over-discharge detection signal OLi (low threshold value AND output), first fault detection signal EUi (low threshold value AND output) and second fault detection signal ELi (high threshold value OR output) in the first embodiment can be obtained, although the structure of the charging condition detecting apparatus CMUi is reduced to almost half in comparison with that of the first embodiment.

Moreover, since high threshold value AND output and low threshold value OR output can also be obtained in addition to these signals, if a fault arises in the charging condition detecting apparatus CMUi, the cause thereof can be identified in detail.

In this embodiment, both outputs of the OR circuit 32 and AND circuit 33 are supplied to the BCU 12, but it is also possible to provide the structure that a selection circuit is provided to the charging condition detecting apparatus CMUi to select an output of the OR circuit 32 when the photocoupler 30 is OFF or to select an output of the AND circuit 33 when the photocoupler 30 is ON. Thereby only the signal selected by the selection circuit is supplied to the BCU 12.

Even in this case, not only the effect similar to that of the set battery system 2 of the first embodiment can be attained but also wiring between the charging condition detecting apparatuses CMU1 to CMUm and the BCU 12 can be reduced to a half.

Moreover, in this embodiment, switching of the threshold value in the over-charge/discharge determining circuit ULij can be controlled by the BCU 12 via the photocoupler 30, but it is also possible to automatically switch the threshold value providing a self-oscillation type oscillation circuit to the charging condition detecting apparatus CMUi to use an output of this oscillation circuit. In this case, since the power source supply line LD is unnecessary, the wiring between the charging condition detecting apparatuses CMU1 to CMUm and the BCU 12 can further be reduced.

The above embodiments may be modified in various forms.

For instance, although the number of cells is not limited, it is desirable, when the lithium battery in the average cell voltage of 3.6V is used, that four to six unit cells are connected in series from the viewpoint of the breakdown voltage of circuit elements forming the charging condition detecting apparatus CMUi. Particularly when the charging condition detecting apparatus CMUi is formed as the integrated circuit (IC), it is desirable that the six or less number of unit cells are connected in series.

Figure 6:
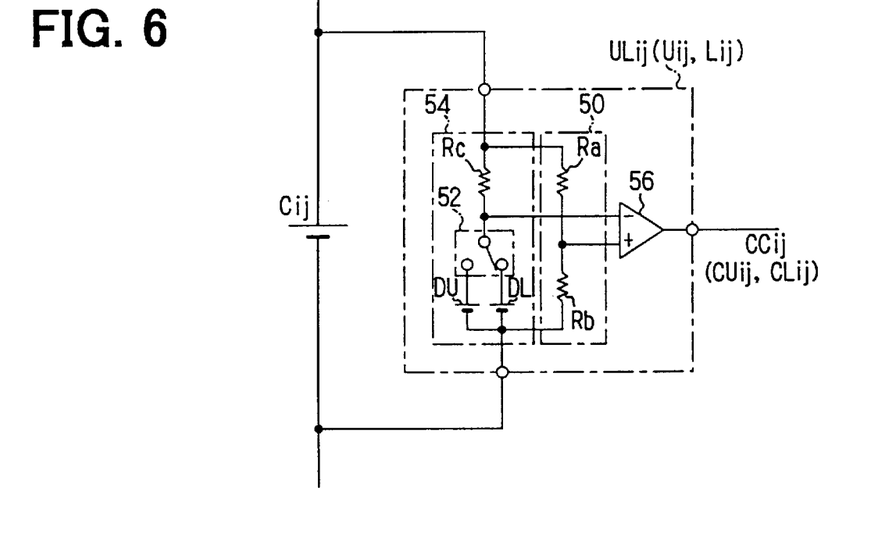
FIG. 6 is a circuit diagram showing a modification of the over-discharge determining circuit or the over-charge determining circuit.

Moreover, in above embodiment, the over-charge determining circuit Uij, over-discharge determining circuit Lij and over-charge/discharge determining circuit ULij are constructed to relatively change the threshold value voltage by changing a voltage dividing ratio to divide the cell voltage Vcij. It is also possible, as shown in FIG. 6, to use a reference voltage generation circuit 54 comprised of a selection circuit 52 to select any one of the voltage generation sources DU, DL and connect it to a resistor Rc in conjunction with a voltage dividing circuit 50 comprised of resistors Ra, Rb, the resistor Rc, two kinds of voltage generation sources DU, DL and a switch circuit 44 and a comparator 56 which compares an output of the voltage dividing circuit 50 with the output of the reference voltage generation circuit 54 in view of changing in direct the threshold value voltage generated by the reference voltage generation circuit 54.

Figure 7:
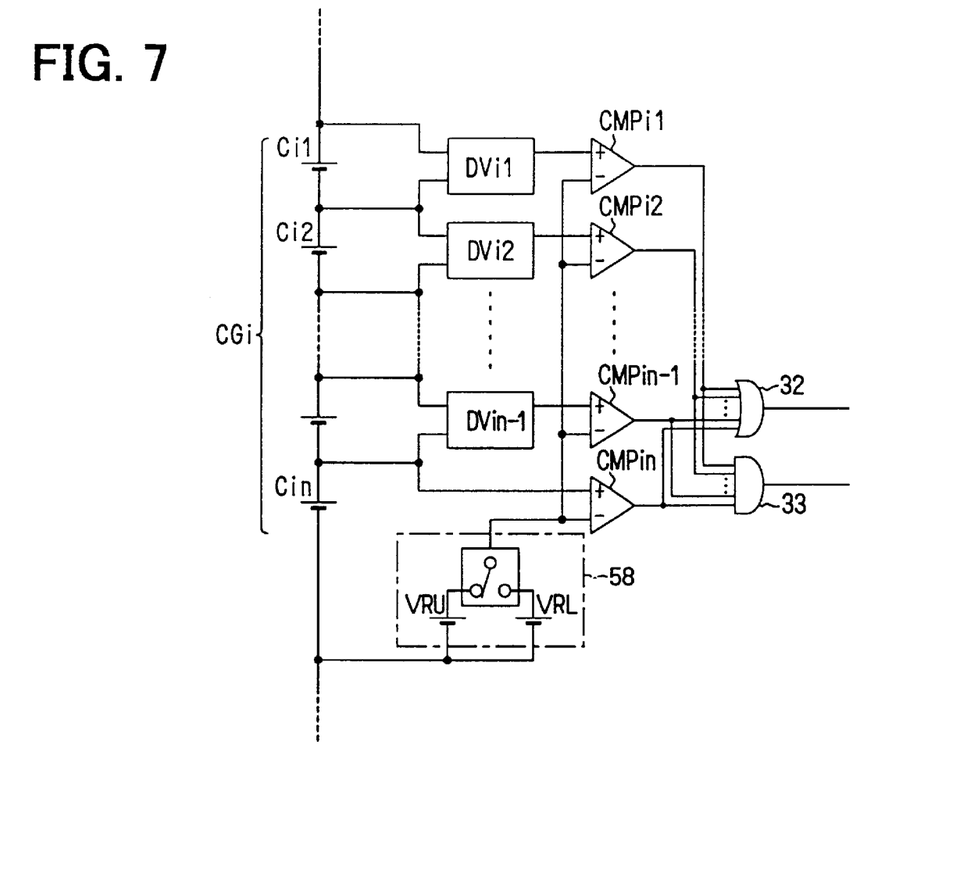
FIG. 7 is a circuit diagram showing a further modification of the over-discharge determining circuit or the over-charge determining circuit.

Moreover, as shown in FIG. 7, the over-charge determining circuit Uij, over-discharge determining circuit Lij and overcharge/discharge determining circuit ULij may be formed of a voltage detection circuit DVij which converts, for every unit cells Ci1 to Cin forming the cell group CGi, the cell voltage VCij of the unit cell Cij to the voltage with reference to a negative potential of the cell group CGi and a comparator CMPij which compares an output of this voltage detection circuit DVij with the reference voltage supplied from an external circuit. In addition, it is also possible that a reference voltage generation circuit 58 is also applied separately to generate any one of the references VRU, VRL with reference to a negative potential of the cell group CGi conjunction with the switch circuit 44 and the reference voltage generated by this reference voltage generation circuit 58 is supplied to the comparators CMPi1 to CMPin.

In this case, the voltage detection circuit DVij cannot be formed as an integrated circuit, but the other circuit elements may be formed as the integrated circuit even when a large number of unit cells are used to form a cell group CGi.

In above embodiments, moreover, the active level when the over-charge determining circuit Uij detects the over-charge condition is set to the high level and the active level when the over-discharge determining circuit Lij detects the over-discharge condition is set to the low level. But, any one of the high level and low level may be set as the active level. However, it is preferable that an operation current flowing into the charging condition detecting apparatus CMUi is reduced as much as possible when the over-discharge condition is detected.

Furthermore, as the unit cells C11 to Cmn forming the set battery 10, the other secondary battery such as a lead-acid battery and a nickel-based battery and the other desired battery such as a cell module in which a plurality of unit cells are connected in series or parallel can also be used as well as the lithium battery. These batteries are resistive to the over-charge condition and over-discharge condition in comparison with the lithium secondary battery. It is therefore not always required for these batteries to detect the charging condition. However, the maximum performance of a set battery can be obtained and the operation life thereof can also be extended by adapting the charging condition detecting apparatus of the present invention to such set battery.

What is claimed is:

1. A charging condition detecting apparatus comprising:
    a first voltage comparator which is provided for every unit cell forming a chargeable/dischargeable set battery to provide an output of an active level when a cell voltage across the unit cell is higher than a first threshold value voltage set to an upper limit value of an allowable voltage range of the cell voltage;
    a second voltage comparator which is provided for every unit cell to provide an output of the active level when the cell voltage of the unit cell is lower than a second threshold value voltage set to a lower limit value of the allowable voltage range;
    a first logical sum calculation circuit for generating an over-charge detection signal by obtaining a logical sum of the outputs of the first voltage comparator;
    a second logical sum calculation circuit for generating an over-discharge detection signal by obtaining a logical sum of the outputs of the second voltage comparator;
    a threshold value voltage changing circuit for changing, depending on an external command, the first threshold value voltage to a first inspection value lower than the lower limit value of the allowable voltage range and also changing the second threshold value voltage to a second inspection value higher than the upper limit value of the allowable voltage range;
    a first logical product calculation circuit for generating a first fault detection signal by obtaining a logical product of outputs of the first voltage comparator; and
    a second logical product calculation circuit for generating a second fault detection signal by obtaining a logical product of outputs of the second voltage comparator.

2. A charging condition detecting apparatus according to claim 1, further comprising:
    a selection circuit is provided for selecting and outputting the over-charge detection signal and the over-discharge detection signal before the first and second threshold value voltages are changed by the threshold value voltage changing circuit, and then selecting and outputting the first and second fault detection signals after the first and second threshold value voltages are changed.

3. A charging condition detecting apparatus according to claim 1, wherein:
    each of the first and second voltage comparators is constructed with a voltage dividing circuit for dividing the cell voltage and a comparator for comparing a comparison voltage generated with the voltage dividing circuit with a reference voltage which is set to a value obtained by dividing the upper limit value or lower limit value of the allowable voltage range with a voltage dividing ratio of the voltage dividing circuit; and
    the threshold value voltage changing circuit changes the first or second threshold value voltage by changing the voltage dividing ratio of the voltage dividing circuit to relatively change the comparison voltage for the reference voltage.

4. A charging condition detecting apparatus according to claim 1, wherein the first and the second voltage comparators operate by receiving a power source voltage supplied from the unit cells as a comparison object in the voltage comparator or a group of the unit cells to which the unit cell belongs.

5. A charging condition detecting apparatus according to claim 1, wherein the unit cell is a lithium battery constructed with electrodes formed of material which absorbs and releases lithium ions.

6. A charging condition detecting apparatus according to claim 1, wherein the set battery is a vehicle battery loaded as a power source of an electric vehicle or a hybrid electric vehicle.

7. A charging condition detecting apparatus comprising:

a voltage comparator provided for every unit cell forming a chargeable/dischargeable set battery to provide an output of an active level when a cell voltage across the unit cell exceeds, in a side going out of an allowable voltage range, a threshold value voltage which is set to a boundary value of the allowable voltage range of the cell voltage;

a logical sum calculation circuit for obtaining a logical sum of outputs of voltage comparator provided for every unit cell;

a threshold value voltage changing circuit for changing, depending on an external command, the threshold value voltage to an inspection value with which the comparator provides an output of the active level from the boundary value when the unit cell voltage is within the allowable voltage range; and a logical product calculation circuit for obtaining a logical product of the outputs of the voltage comparator provided for every unit cell.

8. A charging condition detecting apparatus according to claim 7, wherein any one of the boundary value and inspection value is set as an upper limit value of the allowable voltage range and the other is set as a lower limit value of the allowable voltage range.

* * * * *